(12) United States Patent
Markovitch et al.

(10) Patent No.: US 12,489,320 B2
(45) Date of Patent: Dec. 2, 2025

(54) SYSTEM FOR LOCATION AND CHARGING OF WIRELESS POWER RECEIVERS

(71) Applicant: Wi-Charge Ltd., Rehovot (IL)

(72) Inventors: Hen Markovitch, Modiin (IL); Ilanit Shapir, Rehovot (IL); Lior Golan, Ramat Gan (IL); Zohar Levin, Rehovot (IL); Omer Nahmias, Aminadav (IL); Yan Rosh, Tel Aviv (IL); Alexander Slepoy, Chandler, AZ (US); Ortal Alpert, Ness Ziona (IL)

(73) Assignee: Wi-Charge Ltd., Rehovot (IL)

( * ) Notice: Subject to any disclaimer, the term of this patent is extended or adjusted under 35 U.S.C. 154(b) by 65 days.

(21) Appl. No.: 18/697,575

(22) PCT Filed: Sep. 30, 2022

(86) PCT No.: PCT/IL2022/051040
§ 371 (c)(1),
(2) Date: Apr. 1, 2024

(87) PCT Pub. No.: WO2023/053126
PCT Pub. Date: Apr. 6, 2023

(65) Prior Publication Data
US 2024/0413667 A1  Dec. 12, 2024

(30) Foreign Application Priority Data
Sep. 30, 2021  (IL) .......................................... 286842

(51) Int. Cl.
*H02J 50/30* (2016.01)
*H02J 7/35* (2006.01)
(Continued)

(52) U.S. Cl.
CPC ................ *H02J 50/30* (2016.02); *H02J 7/35* (2013.01); *H02J 50/80* (2016.02); *H02J 50/90* (2016.02)

(58) Field of Classification Search
CPC .. H02J 50/30; H02J 50/80; H02J 50/90; H02J 7/35
(Continued)

(56) References Cited

U.S. PATENT DOCUMENTS 7,068,991 B2 * 6/2006 Parise ..................... H02J 50/10
455/343.1
7,321,114 B2 * 1/2008 Lizotte ................. B23K 26/702
250/234
(Continued)

FOREIGN PATENT DOCUMENTS

WO  2016042511 A2  3/2016

OTHER PUBLICATIONS

International Search Report and Written Opinion for International Application No. PCT/IL2022/051040 mail date Jun. 12, 2024, 13 pages.

*Primary Examiner* — Alfonso Perez Borroto
(74) *Attorney, Agent, or Firm* — Maine Cernota & Curran

(57) ABSTRACT

A wireless power transmitter for powering a remote receiver using a laser beam, the laser beam generator having current inputs and outputs electrically insulated from their surroundings, and each including a separate controlled gated switch. The transmitter has a beam adjustment element for switching the beam between a collimated beam for power transfer, and a more divergent beam for scanning, which is performed by a beam deflector. A detection system detect the presence of a receiver, and is used to ensure accurate beam impingement on the power receiving element. A controller senses when the beam is centered on the power receiving element, switches from the divergent scanning beam to the collimated (Continued)

beam, and instructs the beam generator to raise the power of the laser beam to a level for powering the receiver. The gate controller operates at a higher voltage than the other system control circuits.

20 Claims, 7 Drawing Sheets

(51) Int. Cl.
*H02J 50/80* (2016.01)
*H02J 50/90* (2016.01)

(58) Field of Classification Search
USPC .......................................................... 307/104
See application file for complete search history.

(56) References Cited

U.S. PATENT DOCUMENTS

| | | | |
|---|---|---|---|
| 2005/0190427 A1 | 9/2005 | Steinsiek | |
| 2006/0266917 A1* | 11/2006 | Baldis | H01Q 3/46 |
| | | | 250/200 |
| 2007/0019693 A1* | 1/2007 | Graham | H02J 50/30 |
| | | | 372/38.09 |
| 2008/0130124 A1* | 6/2008 | Graham | H02J 5/00 |
| | | | 359/614 |
| 2018/0123403 A1* | 5/2018 | Kare | H02J 50/30 |
| 2018/0364333 A1 | 12/2018 | Jungwirth | |

\* cited by examiner

SYSTEM FOR LOCATION AND CHARGING OF WIRELESS POWER RECEIVERS

RELATED APPLICATIONS

This application is a national phase application filed under 35 USC § 371 of PCT Application No. PCT/IL2022/051040 with an International filing date of Sep. 30, 2022, which claims priority of IL Patent Application 286842 filed Sep. 30, 2021. Each of these applications is herein incorporated by reference in its entirety for all purposes.

FIELD

The present disclosure describes technology related to the field of the transmission of laser power to a remote receiver, and especially in decreasing the time taken by the system to locate a remote receiver and improving the reliability of detecting receivers.

BACKGROUND

The present disclosure attempts to provide novel systems and methods that overcome at least some of the disadvantages of prior art systems and methods. Aiming a laser at the wrong target may have associated hazards even if the beam is low power. For example, a 10 mW, 1060 nm laser is considered a class 1 laser, and hence perfectly eye-safe and generally safe according to 21 CFR § 1040.10 (US CDRH), and according to many other standards in other countries. However, aiming such a beam directly at a camera may result in burning of a pixel on a CMOS sensor, as, if the laser beam quality is good enough, and the camera is focused at the laser source, the beam may focus to a diffraction limited spot on the sensor. For example, with a lens having an NA of 0.25, roughly equivalent to a lens having an f/# of 2, the resulting spot size would be around 5 micron, and the intensity in that spot would be over 47 $KW/cm^2$.

For comparison, the sun, has an angular size of ~0.5°, and using a small camera lens similar to a smartphone camera lens, and having the same numerical aperture (0.25) and an 10 mm focal length, such a lens would have a diameter of ~5 mm, and an area of 0.2 $cm^2$. If directed directly at the sun, such a lens would transmit roughly 20 mW of sunlight, and would create a circle having a diameter of 17 microns. The resulting intensity would be ~8.3 $kW/cm^2$.

Such a 10 mW class 1 laser thus creates a spot roughly 8 times more intense than that of the sun, due to its beam quality, and while such a laser is perfectly safe for humans and animals, and unable to cause fires, it may be above the limits for devices that were designed to be able to withstand less than direct exposure to the sun. This problem must therefore be solved in order to avoid damage to such sensitive apparatus.

Such a laser, on the other hand, is perfectly safe for exposure of humans and animals, as the eye, in common with many cameras, is adapted to withstand such intensities at that wavelength, and filters it out on the way to the retina. This has been tested by many tests and published in scientific papers, as well as by accepted safety standards.

There is nevertheless a need to accurately and efficiently differentiate legitimate receivers designed to handle the laser beam, from objects that may be damaged by the laser.

Another problem with prior art systems is in locating receivers in the vicinity of a transmitter, to which the transmitter is intended to send power. A common method is the use of scanning techniques to locate receivers. While scanning is very accurate, it is time consuming. When a receiver is illuminated by the laser, and either reflects, retroreflects or transmits back to the transmitter, a return signal to provide its identification, such as is disclosed in International Patent Application No. WO 2019/224827 for "A Wireless Power System having Identifiable Receivers", commonly owned and having some common inventors with the present application, the transmitter has to "wait" in order to collect enough signal to be able to positively identify the receiver above the noise background. Furthermore, in order to be able to detect the presence of a receiver, or to decide that the system did not detect any receiver above the background noise level, the transmitter may have to wait for the receiver to wake up in response to its detection of a signal from the transmitter, and to send back a minimal ID packet to the transmitter, such as is disclosed in International Patent Application No. WO 2017/033192 for "Wireless Power Distribution System" commonly owned and having some common inventors with the present application. Furthermore, the small beam area typically associated with a laser-based wireless power systems, mandated in order to minimize PV area and maximize PV efficiency, may make the scan process very time consuming, since the scanning path only covers a small width, and a large number of scan paths must therefore be executed to cover a large search area.

There are three methods generally used to detect the exact direction of the target receiver:
1. Using a feedback generated by the laser beam itself when it impinges on the target, whether a direct retroreflected feedback, or a signal generated within the receiver, according to the level of impingement of the beam.
2. Using a feedback caused by a device such as a camera, separate from the laser system, but which may be part of the same apparatus. For example, a camera may be used to image the volume surrounding the transmitter, and image processing algorithms may be used to identify high contrast objects, such as retroreflectors or barcodes attached to the target receiver.
3. Based on input external to the transmitter, such as a communication message from the receiver or user input.

However, there is still an unmet need for providing a more accurate and speedier method of locating and detecting remote receivers, than those described in previous references.

The disclosures of each of the publications mentioned in this section and in other sections of the specification, are hereby incorporated by reference, each in its entirety.

SUMMARY

The present disclosure describes new exemplary systems for the efficient searching for a remote receiver, and the safe transmitting of laser power from a transmitter to a remote receiver, once the latter has been located.

The transmitter and its concomitant system has two modes of operation, a scanning mode for locating the receiver, advantageously using the same laser as is used to transmit power to the receiver, and a charging mode, used to deliver power from the transmitter to the receiver.

The scan mode is used when the system is searching for receivers, by aiming the laser beam in different directions in order to determine whether a receiver is located there.

The charge mode is used when directing a laser beam from the transmitter to the power receiving element of the receiver, generally to enable the receiver to convert the laser beam into electrical power. A commonly used power receiving element is a photovoltaic cell, which converts the optical incident power into an electrical current, though other elements for conversion of light into electrical power may also be used. In this disclosure, such elements are generically called power receiving elements, or photovoltaic cells, and such nomenclature is not intended to be limiting.

The system of the present disclosure actively controls the optical parameters of the laser in both scan and charge mode, to optimize the beam for optimum performance for the disparate requirements of charge mode and scan mode, while using the same laser gain medium and resonator.

There are many characteristics of the system, which need to differ between charge and scan mode. For example, in charge mode, it is typically better to minimize the laser spot area at the receiver, as the photovoltaic cell in the receiver can thus be smaller, more efficient, and cheaper.

In scan mode, on the other hand, it may be advantageous to increase the spot size at maximal range, so that when the system scans an area, it may do so with fewer sweeps and hence less time. However, such an increased spot size may have lower geometric resolution and hence less accurate receiver location.

The system of the present disclosure uses a switchable transmitter control which enables the transmitter to switch between a large sized beam scanning a pattern with correspondingly widely spaced beam paths, to quickly locate the approximate position of the receiver, and a more tightly configured beam for providing a substantially higher power density once the scan has located and centered on a receiver photovoltaic cell.

Additionally, the controller is configured to use a lower powered beam when in the search and scanning mode, than when in the charging mode. This increases system safety while searching for receivers.

Besides the above mentioned search and power transmitting functionalities, the presently described systems include a number of electrical features of the transmitter which increase safety in the use of the system.

There are two distinct, safety related, functionalities which the control system of such laser power transmission systems has to perform, whether executed by a single controller, or by separate controllers for different aspects of the total safety related total control needs. These two functionalities have different objectives and operation, even though they may be implemented from the same controller or controllers.

The first functionality is related to the overall safety of a technically operational system, and its objective is to ensure that the system does not cause harm. That function is accomplished by estimating the probability of dangerous exposure of a person to the laser beam, and comparing the likelihood of such exposure to both internal and external standards. If the criteria programmed into the controller are such that the operational situation indicates the likelihood of dangerous exposure, the controller is instructed to turn the laser off, lower its power or direct it elsewhere. The controller generally has a number of different methods to perform these actions in a technically functional system, including such actions as reducing or stopping the power to the laser driver, directing the laser to a safe location where it will not dangerously impinge on a sensitive target, and others. Such methods are part of the normal safety procedures implemented by such a laser power transmission system, and as described in a number of patent applications owned by the present applicant, and other references.

The second functionality is directed at system diagnostics, aimed at detecting malfunctions in the system, and responding to them safely. In this implementation, a parameter such as received laser power is measured, and may be compared to another parameter, for instance the laser current and/or its temperature, the comparison or the original measured parameter or a function of it, being tested against some predetermined limits, and a response of the controller generated if the situation deems that necessary. Such safety functionality is described in International Patent Application Publication No. WO 2018/211,506 for "Flexible Management System for Optical Wireless Power Supply" and in International Patent Application Publication No. WO/2019/064305 for "Fail-Safe Optical Wireless Power Supply", both co-owned by the present applicant. Additionally, the controller should also be diagnostically safeguarded, typically, by both internal and external watchdogs to ensure correct functionality, such that it is configured to terminate the laser, if the controller is showing any apparent malfunction. In some implementation, a single watchdog or other means of ensuring proper operation may be used.

There remains, however, one mishap which is not readily safeguarded by such protective control features, and that is the situation in which a physical short circuit, or even an indirect short circuit, such as could be caused by a failed component allowing current passage even when not enabled by the control function, allows current flow though the laser diode source, even when none is allowed by the controller or controllers. Such a short circuit may enable the system to operate in a mode that would project a beam of high power in an unsafe manner. In any such situation, the normal safety precautions may not be operative, as such a short circuit may lead to a drop in system voltage below some component or sub-system operating voltage, or the high temperature resulting from the malfunction may cause some components to fail, or other consequences of the short circuit may lead to a controller failure. Any of such situations could possibly enable passage of a current which may empower laser emission when none should have been permitted by the supposedly electronically sound control system.

The presently described system incorporates a number of features which ensure that in such a possibility, the system is provided with protection that will prevent unintended laser emission under such circumstances in which physical short circuits, or electronically virtual short circuits enable an operating current to pass through the laser diode. Such protective features may include one or more of (i) physical electrical insulation of the laser leads, (ii) the enablement of continued operation of a controller using current storage features instead of the perhaps de-activated control system power supply source, and (iii) independently controlled switches in the anode and cathode leads of the laser that are activated by a novel power supply voltage arrangement, thereby providing protections hitherto unavailable in conventional laser transmission systems.

There is thus provided in accordance with an exemplary implementation of the methods described in this disclosure, a method of providing a remote receiver with laser power from a transmitter, the method comprising:
  (i) scanning a laser beam over a space in which a receiver is likely to be found,
  (ii) ascertaining when the laser beam is impinging on a power receiving element of a receiver, based on indications received from the receiver, and halting the scan,
  (iii) reducing the divergence of the laser beam to reduce the size of the laser beam impinging on the power receiving element, (iv) readjusting the scanning motion to provide a higher spatial resolution of the direction of the scanned laser beam, (v) rescanning the region of the laser beam impingement on the power receiving element to center the laser beam on the power receiving element, and (vi) on receipt at the transmitter of a confirmation that the laser beam is centered on the power receiving element, increasing the power of the laser beam to a predetermined level to provide power to the receiver.

In such a method, centering of the laser beam on the power receiving element may be determined by a signal output from the power receiving element. In such a situation, the centering of the laser beam on the power receiving element may be confirmed by maximization of the signal output from the power receiving element.

Furthermore, in these methods, the indications received from the receiver may comprise a transmission of a signal from the receiver to the transmitter, or receipt at the transmitter of a beam retroreflected from the receiver. In the latter case, the centering of the laser beam on the power receiving element is obtained by determining a central region of an arrangement of peripherally spaced retroreflected beams, having a distance between generally oppositely positioned elements of the arrangement of at least a predetermined distance. The predetermined distance should then be at least the effective dimension of a power receiving element of the receiver.

According to yet another implementation of these methods, centering of the laser beam on the power receiving element may be determined by detecting reflected light having a unique pattern known to be associated with at least one receiver, and determining an indication of the position of the power receiving element of the receiver in a predetermined direction, at a predetermined lateral distance and in a predetermined alignment relative to the unique pattern of reflected light.

Finally, in any of the above described methods, the power receiving element of the receiver may be at least one photovoltaic cell.

There is further provided accordion to another implementation of the methods and systems described in the present disclosure, a wireless power transmitter for transmitting laser power to a receiver, the transmitter comprising:

(i) a laser beam generator adapted to emit a laser beam, the laser beam having at least one scanning mode and at least one charging mode, the at least one scanning mode having:

(a) a lower power level than any charging mode beam, and (b) a beam area, at least at a maximal intended operation range of the transmitter, larger than the area of any charging mode beam, and the laser beam generator further comprising at least one of:

(c) electrically insulated connections for powering the laser beam generator, the insulated connections adapted to reduce the likelihood of an inadvertent electrical connection to the laser beam generator, and (d) at least one gated switch for controlling the flow of current through each of the electrical connections, (ii) a detection element configured to detect if the beam is directed towards a power receiving element of the receiver, and (iii) a controller configured to instruct a laser beam deflector to serially direct the laser beam in multiple directions, and to switch the laser beam generator from emitting a beam having at least one scanning mode to a beam having at least one charging mode when the detection element indicates that the laser beam is aimed in a direction where the presence of a power receiving element is indicated.

In such a wireless power transmitter, the direction or the presence of the power receiving element of the receiver may be indicated by a region of reflected light without additional detected reflections at a predetermined distance from the region of reflected light. Alternatively, the direction or the presence of the power receiving element of the receiver may be indicated by the central region of an arrangement of peripherally spaced reflected light, wherein generally oppositely positioned elements of the arrangement are at least a predetermined distance apart.

According to yet another alternative implementation, the direction or the presence of the power receiving element of the receiver may be indicated by a central region of reflected light, the central region of reflected light being surrounded by an arrangement of peripherally spaced reflected light, with elements of the arrangement being no more than a predefined distance from the central region of reflected light. Alternatively, the direction or the presence of the power receiving element of the receiver may be indicated by a region of reflected light and at least one element directionally aligned towards the region of reflected light and disposed such that an end of the at least one element closest to the region of reflected light is disposed no more than a predetermined distance from the region of reflected light. According to yet another embodiment, detection of reflected light having a unique pattern known to be associated with at least one receiver, may provide an indication of the position of the power receiving element of the receiver in a predetermined direction, at a predetermined lateral distance and in a predetermined alignment relative to the unique pattern of reflected light.

In any of the above described wireless power transmitters, the predetermined distance should be at least the effective lateral dimension of the power receiving element of the receiver.

Referring now to the beam modes, in any of the above described wireless power transmitters, the scanning mode should have a beam area at the maximal operation range of the transmitter, at least 10% greater than the area of the charging mode at the same distance. The beam area is measured in a region of the beam having an intensity at least $1/e^2$ of the peak intensity of the beam. Additionally, the laser beam deflector should be of such a size that it can accommodate at least 75% of the area at the transmitter of a beam in a scanning mode. Also, the controller should be adapted, during charge mode operation, to direct the laser beam in a field of view significantly less than the full field of view of the beam. This field of view of the directed laser beam should span less than 0.008 steradians. Additionally, the serial multiple directions should comprise a predetermined scanning pattern.

According to another alternative implementation of the above described wireless power transmitter, the laser generator may emit a beam by application of a voltage of no more than 1.5 V. Furthermore, the gated switches for controlling the flow of current through each of the electrical connections of the laser beam generator may be activated by a gate driver having an operating voltage higher than the operating voltage of the controller. In such a case, the gate driver should be configured to hold each of the gated switches in its conducting state, when the gate driver is instructed to activate the gate. Then, a fall of the operating voltage of the gate driver to a level below the operating voltage of the controller, should cause the gate switches to revert to a non-conducting state.

In any of the above described wireless power transmitters, before instructing the laser beam generator to emit a beam having a charging mode, the controller may be further configured to instruct the beam generator to reduce the area of the scanning beam such that the location of a power receiving element is indicated with increased accuracy.

Finally, in any of the above described wireless power transmitters, the power receiving element of the receiver may be at least one photovoltaic cell.

According to a further implementation of the present disclosure, there is further provided a wireless power system for transmitting power to a receiver, the wireless power system comprising:
 (i) a transmitter, the transmitter comprising:
  a laser generator generating a beam having either a large area mode or a small area mode, the laser generator having at least two electrical contacts each of which is electrically isolated from its surroundings, and each of which is switchable, and
  a beam direction member configured to aim the laser beam sequentially in multiple directions and having a size such that it can accommodate the large area mode,
 (ii) a detection member configured to detect if the beam is aimed towards a receiver. and
 (iii) at least one controller module adapted to control at least one of an operation mode of the laser generator and an aim direction of the beam direction member, the at least one controller module receiving the output of the detection member,
 wherein the transmitter has at least one scan mode and at least one charge mode, the scan mode being characterized in that at least one controller module controls the aiming of the laser beam in more than one direction and records the output of the detection member as a function of the aiming direction, and
 wherein the scan mode is characterized by the laser generator operating in the large area mode, the large area mode being characterized in that the laser beam has a larger area at least one distance from the transmitter compared to the small area mode, the area being in a region of the beam having an intensity of at least $1/e^2$ of the peak intensity of the beam, and
 wherein the charge mode is engaged (a) only following an execution of the scan mode and (b) only if the laser beam is aimed in a direction in which the detection member indicates the presence of a power receiving element of the receiver.

According to yet a further implementation of the wireless power receivers for converting a laser beam generated by a laser generator to electrical power, the wireless power receiver comprises:
 (i) a power receiving element,
 (ii) a voltage converting electronic circuit, and
 (iii) a beam impingement indicator configured to generate, or to return or to enable a wireless signal upon encountering impingement of a laser beam on, or in the vicinity of the power receiving element, the wireless signal being configured to cause the laser generator to operate either in a scan mode or in a charge mode, the charge mode being emitted only after a scan mode has terminated,
  wherein the charge mode is characterized in having a beam with an area at the receiver smaller than the area associated with the scan mode beam, and a power higher than that of the scan mode beam.

In such a wireless power receiver, the power receiving element of the receiver may be at least one photovoltaic cell. Furthermore, the area may be measured in the region of the beam where the intensity is $1/e^2$ of the peak intensity.

There is further provides, a method of transferring power from a transmitter to a receiver using a laser beam, the method comprising:
 (i) operating the laser beam in a large area mode having a first power level,
 (ii) aiming the laser beam sequentially in a plurality of directions,
 (iii) using a beam impingement indicator, determining the presence of a receiver in any direction, but precluding the beam from operating at a higher power level unless a power receiving element of the receiver indicates that the beam is impinging thereupon,
 (iv) switching the laser beam to operate in a small area mode having a second power level greater than the first power level, while ensuring that switches in the current leads to both terminals of the laser generator are in a conducting state, and
 (v) adjusting the direction of the small area mode laser beam to provide either a maximum indication of power received from the laser beam, or an indication that the beam is in the central area of a plateau of power received from the laser beam.

In such a method of transferring power, the beam impingement indicator may determine the presence of the receiver by detecting laser power reflected from the receiver, or by detecting a wireless signal generated by the receiver as a result of laser beam impingement on a power receiving element of the receiver.

In yet a further implementation of the methods of the present application, there is provided a method of supplying a remote receiver with laser power from a transmitter, the method comprising:
 (i) scanning a laser beam over a space in which a receiver is likely to be found,
 (ii) ascertaining when the laser beam is impinging on a power receiving element of a receiver, based on indications received from the receiver, and halting the scan,
 (iii) rescanning the region of the laser beam impingement on the power receiving element with a higher resolution scanning path, to center the laser beam on the power receiving element, and
 (iv) on receipt at the transmitter of a confirmation that the laser beam is centered on the power receiving element, increasing the power of the laser beam to a predetermined level to provide power to the receiver.

In yet another aspect of the present disclosure, there is provided a wireless power transmitter for powering at least one receiver using a laser beam, comprising:
 (i) a laser generator adapted to generate the laser beam, the laser generator comprising at least a current input and a current output electrical conductor, each of which is electrically insulated from its surroundings, and each of which includes a gated switch,
 (ii) a beam adjustment element adapted to switch the laser beam between a collimated beam adapted to operate in a charging mode, and a more divergent beam adapted to operate in a scan mode,
 (iii) a beam deflection member configured to scan the laser beam in multiple directions.

(iv) a detection system configured to detect the presence of a receive by outputting a signal when the beam is aimed towards a power receiving element of a receiver, and (v) a controller adapted to control the operation of the laser generator and of the beam deflection member, and adapted to store the output of the detection system in its memory as a function of beam direction, wherein, if the controller senses that the detection system indicates that the laser beam is impinging on the power receiving element of the receiver, the controller is adapted to switch from the more divergent beam to the collimated beam, and to instruct the laser generator to raise the power of the laser beam to a level suitable for powering the receiver.

In such a wireless power transmitter, the more divergent beam may be characterized in that the beam waist is located between the transmitter and half the distance from the transmitter to the maximum intended operating distance of the transmitter. The beam waist may be defined as the position in space where the area of the beam is smallest, as measured along the beam after emission from the transmitter. Furthermore, the collimated beam may be characterized in that it has a Rayleigh length of at least 40% of the maximal intended operating range of the transmitter.

A further embodiment described in this application involves a wireless laser power transmitter for transmission of power to a remote receiver, comprising:

(i) a beam generator adapted to generate a laser beam, the beam generator comprising at least an input electric current conductor and an output electric current conductor, each of which is electrically insulated from its surroundings, and includes a gated switch, (ii) a mechanically mounted lens having an optical power and being in a position relative to the beam generator (iii) a beam deflection member configured to scan the laser beam in multiple directions, (iv) a receiver impingement detector, configured to indicate when the beam impinges on the remote receiver, and (v) a controller adapted to generate longitudinal motion of the mechanically mounted lens such that the laser beam can be switched between (a) a divergent state, having a first Rayleigh length defining a scanning mode of the beam, the scanning mode being adapted to search for the receiver using the beam deflection member, and (b) a collimated state, having a second Rayleigh length, greater than said first Rayleigh length and being at least 10% of the maximal operational distance of said transmitter, defining a charging mode of the beam, the charging mode beam being adapted to supply laser power to the receiver, and being capable of being engaged only after the controller indicates that the beam has operated in its scanning mode.

In such a wireless laser power transmitter, the beam generator may comprise a laser diode. Additionally, the controller may be further adapted to record the output of the receiver impingement detector as a function of the directions in which the beam deflection member scans the laser beam. Also, the controller may be further adapted to increase the power of the laser beam only once the charging mode has been engaged.

Finally, according to yet a further embodiment of the present disclosure, there is further provided a wireless laser power transmitter for transmission of power to a remote receiver, comprising:

(i) a beam generator comprising a laser, thermally coupled to a temperature control unit, (ii) a lens having an optical power and being in a position relative to the beam generator, such that the Rayleigh length of the laser beam is greater than 10% of the maximal operating range of the transmitter, the laser generator comprising at least an input electric current conductor and an output electric current conductor, each of which is electrically insulated from its surroundings, or each of which includes a gated switch, and (iii) a receiver impingement detector, configured to indicate when the beam is impinging on the remote receiver, wherein the temperature control unit is adapted to change the temperature of the laser, such that the divergence of the laser beam changes from a higher divergence level to a lower divergence level, and wherein:

(a) the higher divergence beam defines a scan mode of the laser beam, adapted to scan the laser beam in a plurality of directions, and to record the direction of the laser beam when the receiver impingement detector indicates that the beam is impinging on the remote receiver, and (b) the lower divergence beam defines a charging mode of the laser beam, adapted to focus the laser beam on the receiver and to provide power to the remote receiver, the charging mode being actuated only after the receiver impingement detector has further indicated that the beam is impinging on a power receiving device of the remote receiver.

BRIEF DESCRIPTION OF THE DRAWINGS

The present invention will be understood and appreciated more fully from the following detailed description, taken in conjunction with the drawings in which:

FIG. 4A is an overall view of the transmitter unit, while FIG. 4B shows a number of electrical features of the transmitter which increase safety in the use of the system;

DETAILED DESCRIPTION

Figure 1A:
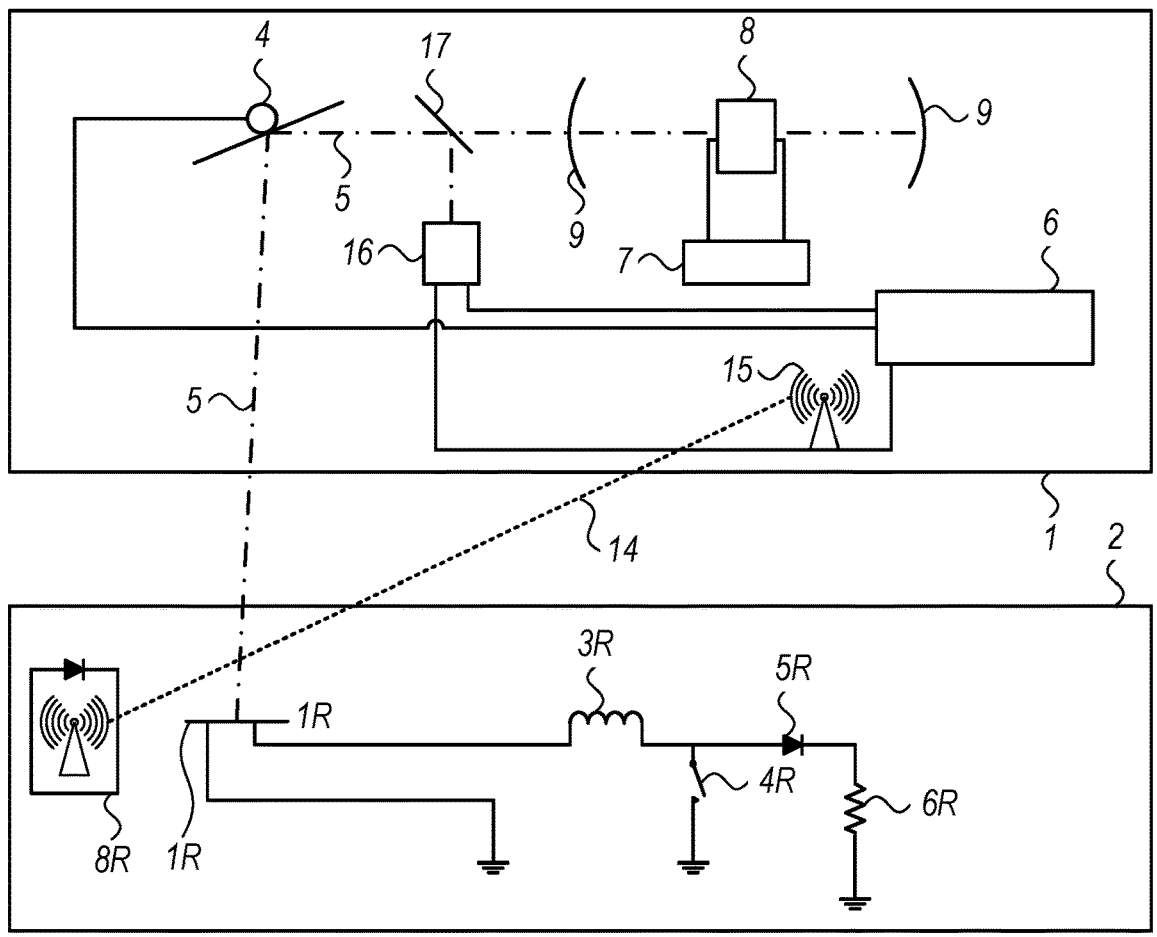
FIG. 1A shows an exemplary prior art wireless power transmission system, while FIGS. 1B and 1C schematically show two differently characterized scanning patterns for the scan mode of the system.

Reference is first made to FIG. 1A, which is a schematic diagram showing a detailed description of an exemplary prior art wireless power transmission system, such as is described in International Patent Application published as WO2017/009854 for "A System for Optical Wireless Power Supply" commonly owned by the present applicant. The system comprises a transmitter 1 and receiver 2. In general, the transmitter and receiver will be located remotely from each other, but are shown in FIG. 16, for convenience, to be close to each other. Beam 5 transfers wireless power from transmitter 1 to receiver 2.

In the receiver 2, the power beam 5 impinges on the optical-to-electrical power converter 1R. Components situated within the receiver are distinguished by the letter "R" after the reference character. In a typical configuration, the optical-to-electrical power converter 1R is a photovoltaic cell. Signaling detector 8R indicates that beam 5 is impinging on photovoltaic cell 1R and transmits that information, along with any other receiver identity or receiver power needs information, to the transmission controller 3, in this example system, located in the transmitter 1. The control signal is transmitted by a link 14 to a detector 15 on the transmitter. The receiver photovoltaic cell 1R typically yields a voltage between 0.35 and 1.1V, though the use of multi-junction photovoltaic cells may yield higher voltages. Power flows from the photovoltaic cell 1R to a conventional boost voltage converter, comprising an inductor 3R, a switch 4R, typically a MOSFET transistor connected to a control circuit (not shown in FIG. 1A), through diode 5R and into load 6R, which can then use the power. The receiver may be connected to the load 6R directly, as shown in FIG. 1A. or the load 6R can be external to the receiver, or it may even be a separate device such as a cellphone or other power consuming device, and it may be connected using a socket such as USB/Micro USB/Lightning/USB type C. In most cases there would also be an energy storage device, such as a capacitor or a battery connected in parallel to load 6R, or load 6R may include an energy storage device such as a capacitor or a battery.

Transmitter 1 generates and directs power beam 5 to the receiver 2. In a first mode of operation, transmitter 1 seeks the presence of receivers 2 either using a scanning beam, or by detecting the receiver using communication means, such as RF, Light, IR light, UV light, or sound, or by using a camera to detect a visual indicator of the receivers, such as a retro-reflector, or retro-reflective structure, bar-code, high contrast pattern or other visual indicator. When a coarse location is found, the beam 5, typically at low power, scans the approximate area around receiver 2. During such a scan, the beam 5 impinges on photovoltaic cell 1R. When beam 5 impinges on photovoltaic cell 1R, detector 8R detects it and signals the system controller 6 accordingly. Controller 6 responds to such a signal by either or both of instructing laser driver 7 to change the power P it inputs into gain medium 8, and instructing mirror 4 to alter either its scan speed or the direction in which it is directing the beam, or to hold its position, and changing the scan step speed. When gain medium 8 receives a different power P from the laser power supply 7, its small signal gain changes. The gain medium 8 is situated between cavity end mirrors 9, thereby forming a laser resonator, and the generated beam 5 is directed from the transmitter 1 by the scanning mirror 4.

Safety controller 16 receives information from a small portion of the beam 5 coupled out by beam coupler 17, and from the signaling detector 8R, usually through a data channel 14 between the receiver 2 and the transmitter 1. Safety system 31 outputs safety indications to the system control unit 7, which controls the power output of the laser accordingly.

Figures 1B, 1C:
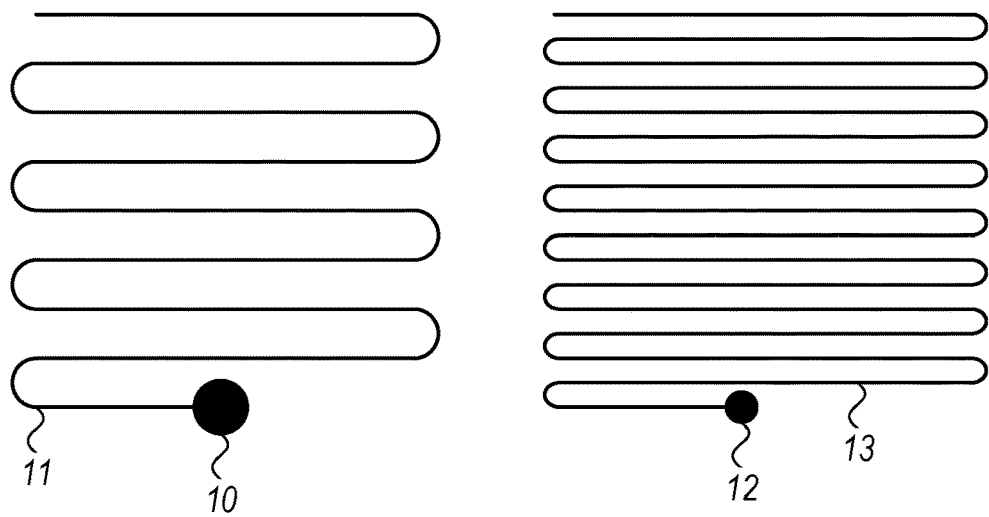

Reference is now made to FIGS. 1B and 1C, which illustrate schematically, according to one implementation of the current system, how the scan mode can provide two differently characterized scanning patterns to provide optimum speed and accuracy of the scanning mode. In FIG. 1B, there is shown the system first scanning with a large spot 10, and hence accordingly using widely spaced, low resolution beam paths 11, to locate the approximate position of the receiver as rapidly as possible. The distance between the paths enables a fast scan to be achieved of the desired region. If a receiver is found in any of the scan paths, the system may perform a higher resolution scan of the vicinity in which a receiver was indicated, using a smaller laser spot 12, scanning more closely disposed paths 13, as shown schematically in FIG. 1C, in order to home-in and determine the exact location of the receiver. Then, the system may aim the beam exactly at the direction where the receiver was located, and can switch to charge mode, in which the laser spot size can be reduced to an even smaller spot, and typically, the laser beam power level is increased in order to charge the receiver found. This bi-functional scan system is thus advantageous over prior art methods which generally use either fast scans with low resolution, or slow scans with high resolution, while the present system, switching between those two modes, is able to achieve a fast search to reach the correct charging position using a wide beam, followed by charging using high positional resolution, and also high powered charging, using a narrow beam.

Figure 2:
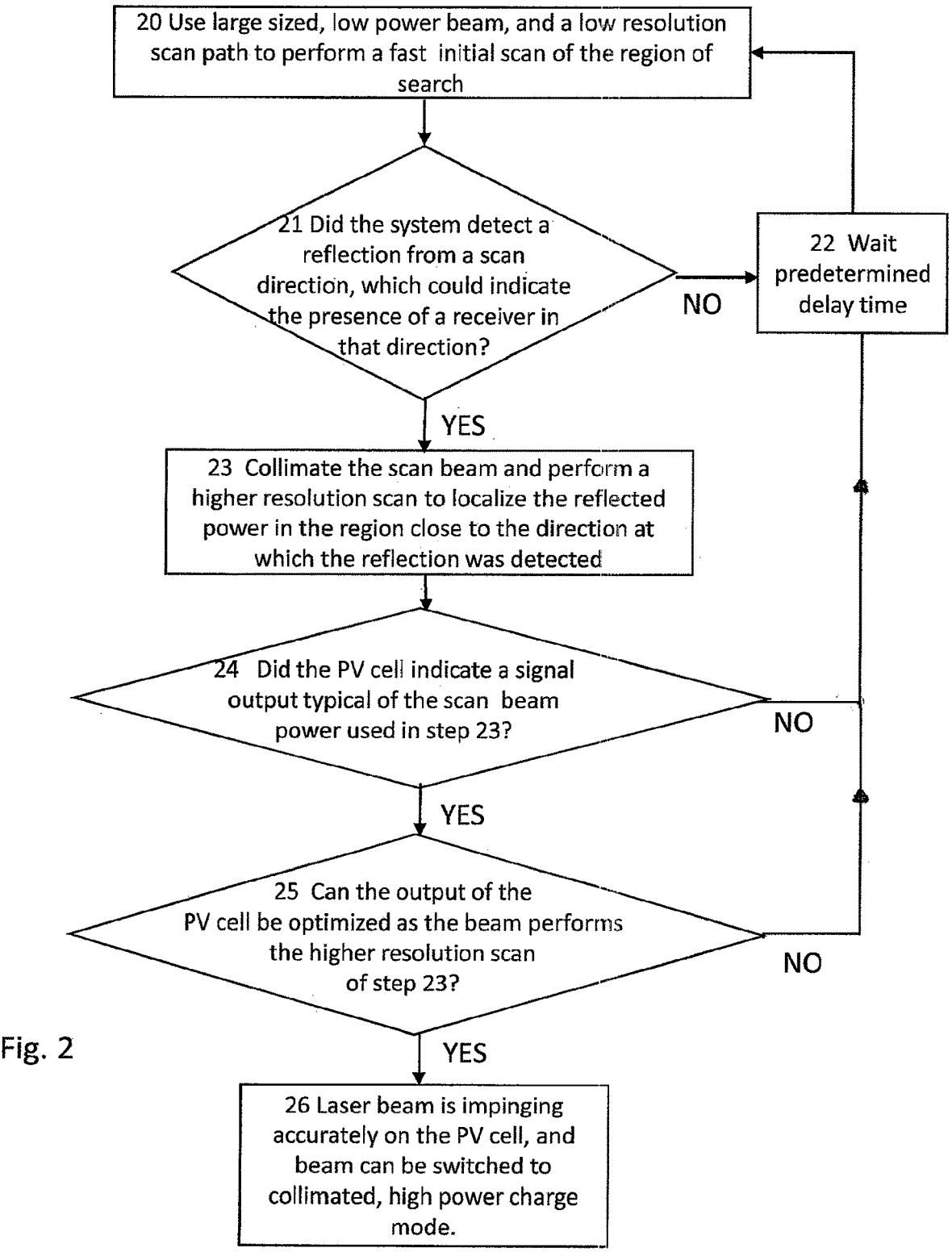
FIG. 2 is a flow chart showing the steps of the procedure of first performing the scan mode and then switching to the charging mode.

FIG. 2 is a flow chart showing one exemplary sequence for the above described procedure of first performing the scan mode and then switching to the charging mode. In this sample sequence, it is assumed, for the sake of simplicity in explaining the procedure, that the presence of a receiver is initially determined by detection of a reflection from a retroreflector on the receiver, and that the retroreflector is located in the same nominal position as the photovoltaic cell, though, as will be shown hereinbelow, this is only one configuration of the retroreflectors and photovoltaic cells on the receiver.

In step 20, the laser beam performs a fast scan of the region where receivers are expected to be found, using the scan or search mode of the laser beam, which is characterized by having a comparatively large beam size, a low power, below the regulatory limit for transmission of laser power in an environment where damage could be caused to humans, animals or articles, and following a coarse, low resolution path, which ensures coverage of a large area in a short time period.

In step 21, throughout the time of the scan performed in step 20, the system determines whether a reflection signal, or another information-bearing signal transmitted, was received at the transmitter, which could indicate that a receiver was being detected in the region, impingement of the scanning beam on a retroreflector providing a signal to the detection circuit, or impingement on another element, possibly indicating the presence of laser power. If the fast scan did not reveal any receivers, in step 22, the system waits for a delay time, which is typically predetermined, or waits for an external trigger, before commencing another scan procedure of the region, the delay time generating energy saving advantages.

On the other hand, if in step 21 a reflected signal was received, indicating impingement of the beam either on a random reflective object, such as, for instance, a retroreflector on a sports shoe, or a real receiver located at the position where the beam scan had reached when the signal was detected, then in step 23 the beam is switched to a more collimated beam, and the resolution of the scan in the region of the potentially detected receiver is raised, such that the beam can determine the impingement position with greater accuracy. At the same time, the power can be raised somewhat, in order to provide a better signal-to-noise ratio, though the power should still be below the permitted threshold for laser beam transmission in the environment.

At this point, in step 24, by measurement of an output of the photoelectric detector on the suspected receiver, the system can now determine with a high level of confidence, that the signal being received is indeed a signal arising from impingement on a receiver, and the confirmed location of the receiver accurately determined.

Then in step 25, either using the same power level or by increasing the power level even more, though still remaining within the allowable threshold, the high resolution scan is continued, though in this case using optimization of the receiver photovoltaic cell output signal as the indicator for defining when the laser beam is impinging accurately on a central position of the receiver photovoltaic cell. At the same time, the receiver controller can be programmed such that when the photovoltaic cell is accurately impinged upon by the laser beam, as indicated by a photovoltaic signal above a certain level, determined before or as a result of the signal level, the receiver will transmit a unique ID signal back to the transmitter confirming that a real receiver has been targeted, and, that that targeting has been achieved with a level determined before or as a result of the signal level, of accuracy. In such a case, in step 26, the laser beam power can now be raised to a level at which the receiver can receive its intended charging power. The system is now in a state of transmitting in its charging mode, with a more collimated beam and a higher power.

On the other hand, if in step 25, the system is unable to determine whether the position of the PV cell of the receiver has been optimally localized, or if no confirmation signal has been sent to the transmitter control system, the system may conclude that the reflection has not risen from a receiver, and the system may, again wait for a predetermined delay time before returning to step 22 perform another scan procedure of the region or may perform steps 25 and 26 again for a predetermined small number of times, but not indefinitely.

The procedure described in the flow chart of FIG. 2 provides the location of the power receiving element of the receiver, with a high level of accuracy. However, in circumstances which permit a lower accuracy, or which require a faster receiver acquisition procedure, it is possible to speed up the procedure by omitting step 23, and proceeding directly to switching to the fully collimated charging mode beam without performing an additional and higher resolution scanning step using a more collimated beam, as described in step 23.

In practical receivers, in order to obtain maximum efficiency, the PV cell should be configured to receive as much of the available laser power as possible, which mandates accurate aiming of the laser beam to the center of the PV cell. With receivers whose construction standard uses a small retro-reflector positioned over a small area at the center of the PV cell, the optimum position of the beam at the center of the PV cell is simply determined when the signal received by the PV cell has a maximum value. Since the beam size should generally be significantly larger than the size of the retroreflector, and, at the receiver distance, the beam may have a more plateau-like profile, rather than a well-defined central peak, it may be necessary to position the beam at a mean central position of those positions that give a close-to-maximal reading. However, other receiver construction methods may position the retro-reflectors around the periphery of the PV cell while keeping the PV cell itself free from the obstruction of such retro reflectors.

Figure 3:
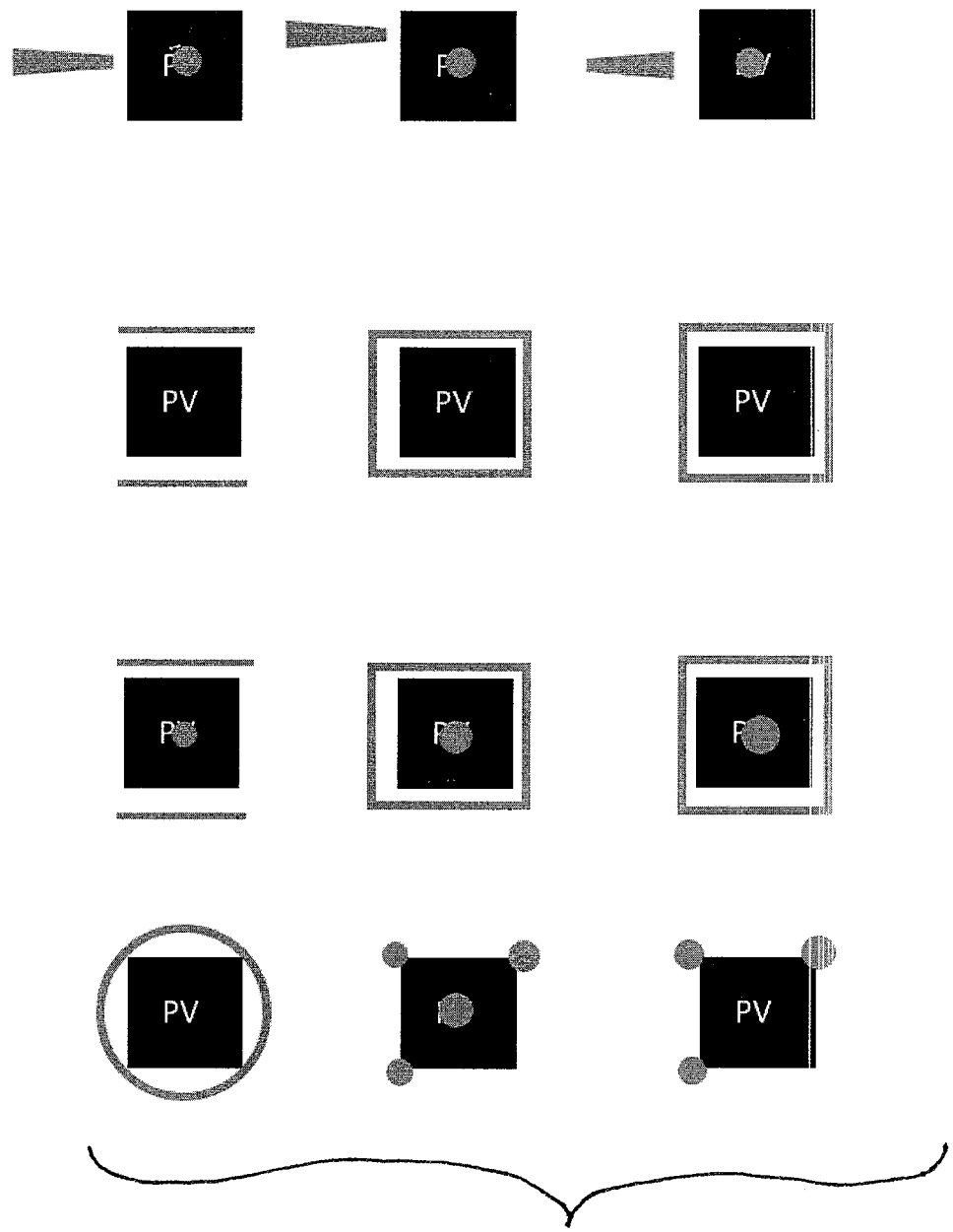
FIG. 3 shows a number of exemplary PV cells with retro reflector configurations arranged around the PV cell.

Reference is now made to FIG. 3, which illustrates an exemplary variety of such retroreflector configurations, in which retroreflectors may be disposed around the periphery of the PV cell itself. This configuration avoids taking up valuable area of the PV cell. The PV cells are designated by a solid fill feature of the drawing, while the retroreflector or retroreflectors are designated by a lightly shaded feature. Some of the configurations also include a small retroreflector at the center of the PV cell, and the surrounding retroreflectors may be used for defining orientation, or as confirmation that the reflection detected by the small central retroreflector does indeed come from a receiver, and is not a spurious reflection from an unassociated object in the scanned region. Some of the retroreflector configurations also have one or more prominent marks which are thus easy to identify, such as those shown in the top row of FIG. 3. In such a configuration, if the scanning mode centers on a reflection from one of the surrounding retroreflectors, it will not be in the correct position in order to provide efficient charging power to the receiver. When such receiver retroreflector configurations are detected, either from the receiver ID or from an analysis of the positions of the reflection signals received, it is important that before issuing the command to increase the laser power to the charging mode, the scanning mode laser beam be directed relative to the retro reflector pattern, such that the beam is centralized on the PV cell. This position may not be in the same direction from which the retroreflected beam was received. Hence, the beam may need to be aimed at a position which has been calculated from the output of the retroreflected signals received by the detector, but not necessarily at a position where the maximum positive indication of the receiver reflection has been detected. Such configurations and especially those with a completely clear PV cell area with the retroreflectors positioned remotely therefrom, therefore require a different scanning protocol from that described above, in that the beam is ultimately aimed at a region of the receiver from which no retroreflected signals are detected, or at another calculated position which does not have to be in the central region of an area where the retroreflector signals were detected. Such a direction is therefore termed in this disclosure, and may also be thuswise claimed, as a direction in which there is a high likelihood that the beam is impinging on the central area of a PV cell. This direction is therefore a direction at which it is not directly indicated by the retroreflection that the PV cell of a receiver is present in that direction, but the associated measurements make it very likely that the beam is aimed at the center of a PV cell of a receiver, even if not a direction from which retroreflections are received. It is to be emphasized that the configurations of the retroreflectors and PV cells shown in FIG. 3 are merely exemplary configurations, and that any other suggested combination may also be used.

As an additional safety feature for such a detection scheme, and before the system allows the beam to be switched to its charging mode, the system may also require a confirmation signal issued by the receiver in response to the impingement of a low power collimated beam on the PV cell, that it has thus homed onto a real PV cell, generating a PV output signal, and not onto a random space in which there happens to be a reflective object.

Therefore, in summary, the system scan controller must be such that it determines that it is centered on the PV cell of the receiver if:

(i) it detects a reflection region, without any additional detected reflections at a distance at least the dimension of the typically used PV cell away, or (ii) it detects a pattern of circumferentially spaced reflected signals, spaced apart by a distance at least the diameter of a typical PV cell, such a pattern indicating a retroreflector arrangement around the PV cell, and then centers itself in the central region of the circumferentially spaced reflection signals, or (iii) it detects a pattern of one or more reflected signals, such a pattern indicating a signaling area which may be retroreflective, phosphorescent or fluorescent, and such a pattern indicating the position of the PV cell with relation to pattern, or (iv) it detects an electronic signal generated by the receiver in response to the laser impinging on the PV cell, and is able to determine that the signal is at a maximum level as a function of the position on the PV cell, or at the center of a plateau of maximum level relative to position across the PV cell.

By this means, the scanning search mode is able to accurately aim for the PV cell regardless of the type or shape of any retroreflection indications of the impingement of the transmitter beam, and even in a situation where the laser beam is directed to a position where the detector circuits did indicate the presence of a receiver, even though no reflection was obtained from exactly that location.

Conversely, after performing the scanning procedure and apparently locating a receiver to be charged, if the receiver does not send a confirmation signal back to the controller that its PV cell is indeed detecting the scanning beam, as determined by the signal which the PV cell should be generating, the system is configured to preclude the transmission of a charging mode beam, since it would appear that the supposedly identified receiver is not in fact such. Additionally, even if the system does switch the beam to charging mode, and the PV cell does not indicate a signal of the level expected from the charging mode, this indicating a successful and safe aiming of the beam at the PV cell of the receiver, the receiver may send a communication back to the control system to switch back to the lower powered, and safer scan mode beam, in order to resume scanning again. This scanning can be performed either in a small local area in order to more accurately locate the PV cell in the receiver, or on a broader scale in order to ensure that the reflections detected are indeed coming from a receiver. At the same time the system should preclude the laser from switching up into charge mode until the detector has positively identified the receiver it is seeking. According to yet further control system configurations, the control system can be programmed to preclude the laser beam from operating in its intermediate power mode, with a collimated beam but at less than the charging mode power level, for more than a predetermined time, if the detection system does not indicate that the beam is aimed towards a receiver. The elapsed time for such a control configuration, could be of the order of a few seconds, depending on the time taken for the scan procedure to cover the entire region to be searched for receivers.

Many other methods are available for providing such a scanning system with the information required to define where the center of the PV cell is. One such method could be any sort of pointing mark, such as an arrow, which can be discerned by a camera on the scanning sub-system, with the tip of the arrow located at the center of the PV cell or a retroreflective arrow or another shape having distinct directive properties, such as are shown in the top row of FIG. 3. Alternatively, the tip of the arrow could be located at a retroreflector at the center of the PV cell. Many other location defining arrangements could be used, and the system is not meant to be limited just to those exemplary arrangements mentioned herewithin.

In the case of receivers which transmit a separate return signal back to the transmitter, such as by a separate communication channel, in order to provide indication that a beam is impinging on the PV cell, the signal should provide information on the level of optical power being received by the PV cell, so that the control system can use that information to adjust the aiming angle of the laser beam scanner to correctly center the beam on the PV cell. The separate returned signal is generally other than an optical signal.

Once the scanning system has confirmed that it is centered on a PV cell of a receiver, the system can switch to charging mode in which the beam is generally focused down, and can begin to transfer power to the receiver, as will now be explained below.

Figure 4A:
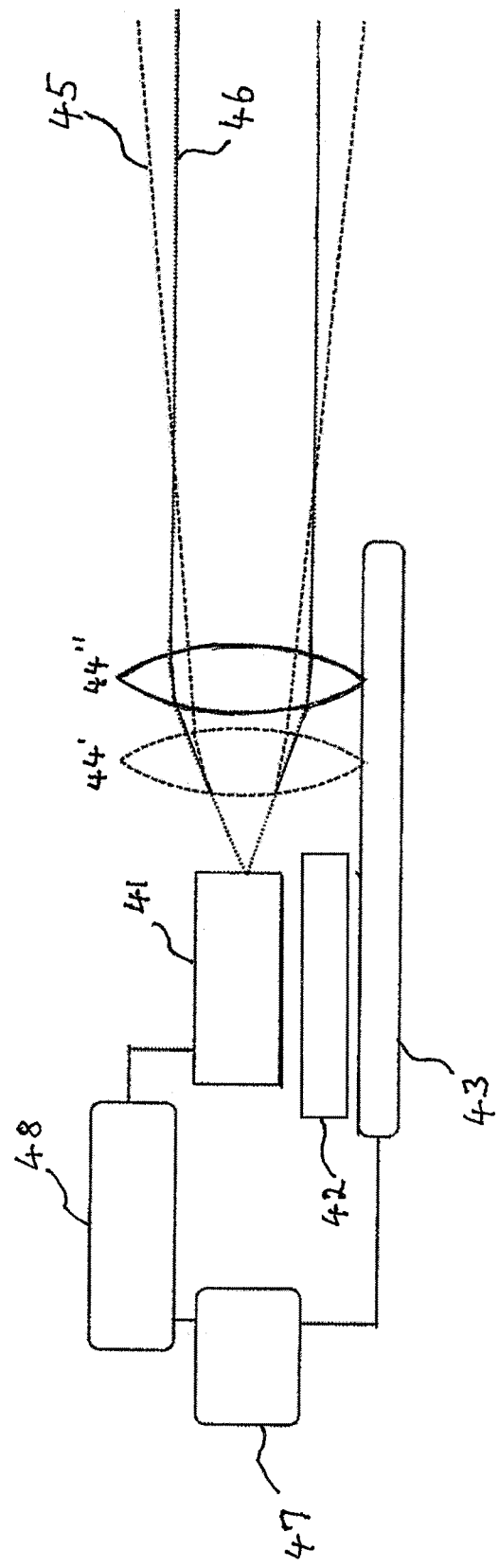
FIGS. 4A and 4B show schematically two views of a system for implementing the methods of the present application.
Figure 4B:
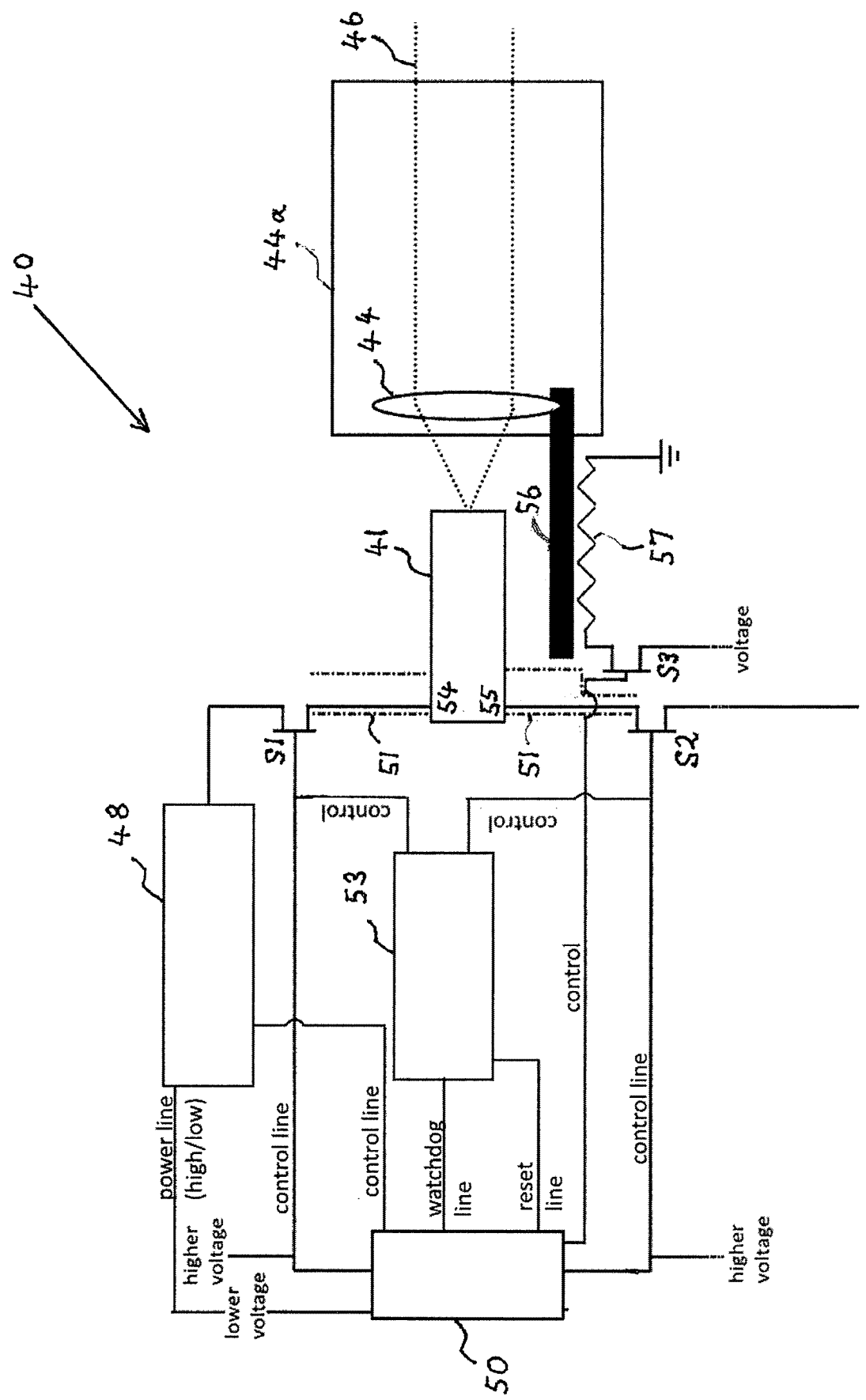
Figure 5:
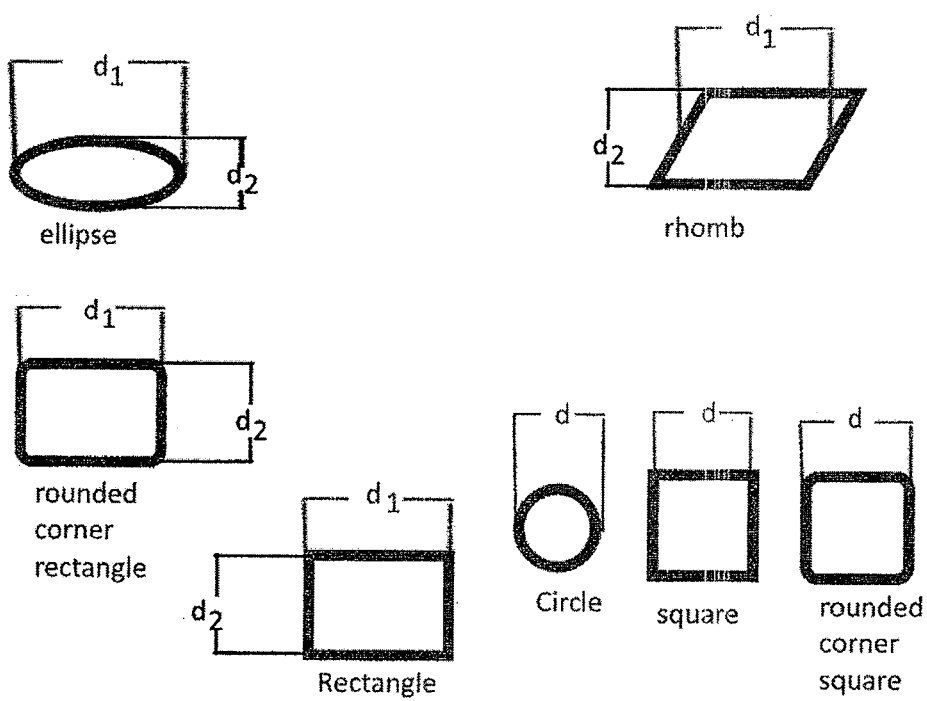
FIG. 5 shows a number of beam shapes which can be emitted by the transmission devices of FIGS. 4A and 4B.

Reference is now made to FIGS. 4A and 4B which show schematically two views of a system for implementing the methods of the present application. FIG. 4A is an overall view of the transmitter unit, while FIG. 4B shows schematically a number of electrical features of the transmitter which increase safety in the use of the system. The system comprises a transmitter and a receiver, only the transmitter unit being shown in FIGS. 4A and 4B. The transmitter comprises a beam generator comprising a laser 41, typically a laser diode driven by the laser driver 48, and generally thermally connected to a temperature control system 42 or at least to a temperature stabilized component of a cooling system. The beam generator has two modes of operation, a scan mode, and a charge mode. Scan mode is characterized in having a lower power level, and a larger beam cross section, especially towards the outer limit of the operational range of the system. The beam generator also typically comprises a lens or a lens system, mounted on a mechanical mounting 43, which may be movable, or having its axial position controlled otherwise, such as by use of a heating source causing expansion of a base on which the lens is mounted. In scan mode, as previously mentioned, the beam generator is configured to generate a larger beam at the outer limit of the intended operational range of the system. This can be achieved either by axially moving the lens relative to the laser position, or by changing the laser wavelength, or by moving the laser, or by changing another optical property of the system to control the optical beam diameter at the end of the field of view (FOV). The word diameter is used here as a commonly used term for the beam size and is not intended to indicate necessarily a circular shape of the spot. The spot may typically be circular, elliptical, rhomboidal, rectangular with rounded edges, square, or any other suitable shape, some examples of which are shown in FIG. 5. The beams typically may have different shapes at different distances from the transmitter.

The beam generation system also includes a laser driver which also should have two modes of operation, scan mode, and charge mode. These differ in that scan mode typically generates a larger area and a lower power level and intensity, while charge mode typically has a smaller area, longer Rayleigh length, and higher power and intensity.

Referring back now to FIGS. 4A and 4B, the exemplary beam generator typically comprises the following elements, some of which may be optional or redundant, and some of which are related to features to ensure safe operation of the generator in case of a mishap during operation or alignment.

In FIG. 4A, there are shown methods by which the system is able to manipulate the beam's diameter at the outer limit of the operational range of the transmitter. Such methods, having. where necessary, more specific details below, may include:

(i) Changing the laser-lens distance
(ii) Changing the focal length of the lens
(iii) Changing the wavelength of the beam
(iv) Changing the temperature or operating conditions of a component in the beam generator
(v) Impressing on the position of the beam a small amplitude vibration at a frequency substantially higher than the scan frequency, such that the beam spreads out and the impingement spot of the beam is enlarged. This can readily be achieved by injecting the high frequency onto the mirror driver, using for instance, a coil, piezo electric crystal or magnetic element, or any other suitable method of generating a vibration in the scanning mirror.

In FIG. 4A, two positions 44', 44" of the collimating lens 44 are shown—one 44' closer to the laser source, and shown with a dashed outline, for the scanning mode, and the other, 44", shown with a solid outline, for the charging mode, distanced further away from the laser. When the lens 44 is in the closer, scanning position 44', the beam 45 is more divergent than when the lens is moved away from the laser source to generate the charging mode 44", in which the beam 46 becomes more collimated and closer to a parallel beam.

The control of the distance of the lens from the laser diode may alternatively be indirectly achieved by controlling the voltage, temperature, current or a control word used in the control system 47. A typical movement of less than 1% of the focal distance of the lens is typically enough, so a piezo electric driver or a thermal control driver can conveniently achieve such control, as will be shown in FIG. 4B.

In FIG. 4B, there is now shown some of the electronic safety mechanisms of the presently described system, optionally used to provide additional safety in operation of the system. Elements of this novel implementation already shown in FIG. 4A have been marked with the same characterizing numbers as those of FIG. 4A. The system 40 shows an arrangement of controller and safety features which are generally used in current systems, together with additional features which can provide the current system with protection against unsafe operation, which is unavailable in previously available systems. Current laser power transmission systems often provide protection in the event that the system determines, typically by noting an unexpected difference between the transmitted power and the received power, that the beam has intercepted an unexpected body in its path from the transmitter to the receiver. As is conventionally performed, the primary control of the laser emission is obtained through the laser power supply, hereinafter called the laser driver 48, which controls the current supplied to the laser diode 41 to generate laser emission 46. The laser driver is subject to the control of the entire laser transmission system whose controller, termed forthwith the main controller 50, traditionally provides various safety features to ensure that the laser emission is terminated by the laser driver power supply 48 in the event of any dangerous conditions arising. Such dangerous conditions generally include predefined malfunctions in any of the control system functions. However, as previously stated, there are certain malfunctions not directly related to the control functions, that may not be effectively handled by conventional safeguards, and it is such situations that the control features of the current system attempt to address. Situations may arise when a fault results in an operating condition which prevents the main controller 50 from operating reliably, and at the same time causes the system to be in an unsafe condition. Such situations include, for instance, an unsuitable voltage being applied to an input to the main controller 50 and at the same time to the laser diode 41, when no such voltage should have been provided. Other conditions in which a fault may cause the main controller 50 to function unreliably are a voltage outside the operational specifications of the controller, or exposure to a temperature outside the operational temperature of the main controller 50, or to an electric or magnetic field outside the operational specifications of the main controller 50. Such faults may arise not from the operation of the main controller itself, but rather because of a mishap unrelated with the operation of the main controller, such as a physical short circuit, as mentioned above, or an unexpected circuit connection because of a failed component. In such a condition, the main controller 50 may become non-operational and unable to successfully cause the laser driver power supply 48 to shut down, or the laser diode itself 41 may still be powered because of the physical short circuit or the circuit malfunction because of a failed component. A number of solutions to deal with such instances are now presented.

In the system of FIG. 4B, the laser diode 41 is powered by a laser driver 48, which receives its instructions from the system main controller 50. This main controller 50 is programmed to cause the laser to turn on and off and to adjust its power level for the various scan, charge, and idling operations, in order to operate the system, and to ensure that users are always safe. The driver sends the appropriate drive current to the laser diode 41, and the input and output current connections of the laser diode, namely to the anode and from the cathode, are shown connected by insulated cables 51, to two auxiliary gated switches S1 and S2, controlled by a gate controller 53. The enablement of current from the laser driver 48 to the anode 54 of the laser diode, and from the cathode 55 of the laser diode to the ground of the circuit, or to the negative terminal of the laser driver is thus controlled by the two switches, S1, S2. This ON/OFF control is in addition to the basic level control of the laser current from the laser driver 48 itself, whose output level is controlled by the main controller 50. These two switches S1, S2, which are held in the conducting state (hereinafter "closed") by control voltages on their gates, are used for additional safety, enabling two additional and independently redundant methods of terminating the current to the laser, which can be implemented either separately or both together. The common method of performing the function of closing down the laser is by use of the main controller 50 to control the laser driver which provides the current to the laser diode 41. However, this may not always achieve its desired function in the event of a short circuit providing current to the laser diode other than through the laser diode driver. It is under these circumstances, for instance, that the two switches provide the additional safety method of shutting down the laser emission when conditions necessitate such a close down.

Although gated switches have been used in previously described systems, to provide an additional channel for interrupting the laser diode current, as indicated by the control lines to the switch gates from the main controller 50, a novel use of the switches in the presently described system arises from the manner in which the switches are powered, relative to the other electronic modules and functions of the system. The operation of these two gated switches makes use of the fact that most infra-red laser diodes typically operate at low voltages, in the region of below 1.5V. This is a significantly lower voltage than that used by most other electronic components associated with the electronic circuitry of the system, being generally based on Si semiconductor technology. Such Si technology devices cannot operate at such a low voltage, and use a higher operating voltage, typically 1.7V, 3.3V, 5V or 12V or others.

In order to implement the powering scheme of the present disclosure, both the anode switch S1 and the cathode switch S2 can be controlled by the function of the additional gate controller 53, which also operates as a system monitor for the specific functions for which it is included. The function of the gate controller 53 is to stop lasing by opening the switch or switches under conditions when the main laser driver controller 50 does not do so when instructed. The gate controller functionality could be incorporated as an additional unit of the main controller 50, but it is preferably implemented as an additional and separate circuit module 53.

At least one of the two switch gates is arranged to be in the normally non-conducting state when not actively held in the conducting state by application of the required voltage to the switch gate. The laser current is enabled during normal operation by holding the gate in its conducting state by a voltage supplied by the gate controller 53. When that latching voltage drops, the gate will revert to the open non-conducting state. The switch gates, or more specifically, the gate controller circuit, are driven from the system main power supply by a separate operating voltage, higher than the voltage supplied to the main controller 50 or the laser driver 48, or any other electronic function in the system. In the event that a physical short circuit occurs, resulting in the application of a voltage of more than 1.5V onto the anode lead of the laser diode, the laser diode will turn on and emit a laser beam, even in a situation when the main controller 50 is instructing the laser driver to be in its off-state, and the anode switch is being instructed to be non-conducting. The same situation applies if such a circuit malfunction occurs in the laser driver 48, and a current is delivered to the laser even when not instructed by the main controller to be in an ON condition. Since the laser diodes operate at 1.5 v or less, and inadvertent application of another voltage present in the circuitry will be higher than 1.5 v, the increased current drawn from the main power supply may cause a fall in the main power supply voltage to all of the control functions of the system, or alternatively, a fall to a level which is not high enough to reliably operate the controller or its watchdog. Since the gates of the switches are actuated by the gate controller 53 at a higher voltage than either the main controller 50 or its watchdog, or both, the fall in voltage will switch the gated switches to their non-conducting state independently of the situation of the main controller or its watchdog. Bringing either of those switches S1, S2, to their non-conducting state will thus stop the diode laser current, and bring the system to a safe state, regardless of the functional action of any of the other circuit controllers, such as the main controller 50, or electronic safeguard mechanisms of the system.

In conclusion, the use of a higher power supply voltage to the gate controller 53 ensures that in the event of a fault causing a reduction in the voltages supplied overall by the power supplies, the gate controller 53 should be the first circuit to drop out, since it is operated at a higher voltage than the other circuit elements, and will thus cut off the gate holding voltage and hence the power to the laser diode, before and independently of what is happening with the other controller functions. The power supply lines and the control and watchdog lines are labelled as such in FIG. 4B.

As an alternative and second method of protecting the system from such a short circuit fault, the main controller 50 may be powered from its power supply with a parallel energy storage device, such as a capacitor, a battery or a coil, (not shown in FIG. 4B) thus enabling it to operate for a time long enough to cause the laser to turn off when such a fault is detected, even when power to the main controller 50 is turned off. The watchdog may also reset the main controller 50 if it stops operating correctly. Typically, such a reset function is also configured to cause the laser to be turned off until the main controller 50 has resumed normal operation. At least one of the switches, anode or cathode, is normally non-conducting, such that if the gate controller 53 is not powered on, the laser, under normal conditions, cannot be powered on.

In a second alternative situation, if the voltage applied to power the main controller 50 drops sufficiently to cause the main controller to malfunction, and therefore not to respond by reducing the unexpected and uncontrolled laser diode current, the feature of making the switch operation through the gate controller 53 dependent on a higher operating voltage than that of the system controller 50 or the laser driver 48, means that the switches will become non-conducting, and hence terminate the laser diode current, regardless of what the system controller or the laser driver are attempting to do.

Thirdly, a main power switch may be provided, enabling the main controller 50 to control the power supply to all the parts mechanically accessible to any point in the circuit electrically connected to the laser anode or cathode. This protection is especially important when a C-mount laser diode is used, since such a C-mount has large areas of exposed metallic surfaces being part of the diode conductors, which could readily be short circuited to ground or to another live metallic contact within the laser generator enclosure, in the event of a mechanical intrusion, or a mechanical fault, such as a loose wire connection becoming free.

Fourthly, all the points in the circuit, including the laser sub-mount, should be electrically insulated. This may be a difficult task to achieve completely without having an effect on the cooling requirements of the laser diode. Consequently, it may be advisable, though not essential, that this safety feature be relied upon only in conjunction with at least one of the other features described hereinabove.

Finally, a laser power metering system may be added to the system for comparing the measured laser output power of the laser diode to the expected laser output power according to the settings of the laser diode controller, or, in the event of the use of more than one control system of any of the above described safety arrangements, according to the settings of the controllers. The expected output power should depend on the operational state of the system, namely whether in scan/search mode, or charge mode. Should this metering system find a significantly higher measured power than is programmed by the controller settings, this indicates a system error or a system mishap, and the lasing should be terminated by use of one or more of the switches mentioned above. The power meter may be a separate controller or the main controller or even a component in, for example, the laser driver.

The beam 46 emitted from a laser diode typically expands comparatively rapidly with distance, as compared with other types of lasers. Consequently, a collimation system is needed to generate a more collimated beam needed for efficient charging.

The collimation system is typically also controlled by a controller, advantageously the main controller 50 as used to control the current to the laser diode. The collimation system may operate by adjusting the axial position of a collimating lens 44 or lens system, thereby controlling the beam expansion, the Rayleigh length and beam width. The axial position may be any form of linear actuator 43, such as magnetic, thermal, piezo-electric, or electromechanical, and the actuator may be controlled by means of another switch S3 whose control input may be made through its switch gate. Alternatively, the collimation may be changed by modifying the laser parameters, such as the laser chip position, the laser wavelength, the beam divergence or another characteristic, by changing an electrical input signal to the laser diode.

When switching to scan mode, the controller(s) allows current to flow through both laser diode switches, and also adjusts the current flow through the lens position actuator 43, or through another system element to control the beam divergence as mentioned above, to bring the collimation of the laser to "wide mode", in which the beam expands towards the end of the system's intended operation range. When switching off, the gate controller 53 may typically block the current through at least one of the laser diode switches.

When switching to charge mode, the controller or controllers amend the current flow through the relevant switches, in order to cause the beam to become smaller at the end of the field of view. This adjustment may be done by instructing the laser driver 48 to supply more current, or by reducing the resistance of the switches S1, S2, by applying a higher gate voltage. The result is that the beam expansion reduces, the Rayleigh length shortens and the beam width decreases. Such control may also be achieved by adjusting the lens position, as described above in connection with FIG. 4A. One method of doing this is by use of an actuator 56 based on magnetic, thermal, piezo, electromechanical or any other drive. In FIG. 4B, there is shown the example of a heat source 57 controlled by switch S3, which can be used to generate thermal expansion of an actuator, thereby moving the lens 44. Driving the lens may need to take into account or even rely on the temperature changes caused by higher driving laser power. Another alternative is to modify the laser parameters, such as position, wavelength, divergence by changing an electrical input to the laser diode 41. The controller(s) may be further connected to a laser power meter, which may be used to control laser power, and to detect if it malfunctions, and in such a case to instruct the controller to disconnect the switches, and possibly to a power switch allowing termination of electrical power supplied to the laser driver.

The transmitter system should further include a beam deflection module (not shown in the drawings) and a detector for detecting if the beam is directed towards a receiver. Such a detector may consist of a sensor adapted to detect a reflection or a retro-reflection of the transmitted beam back from the receiver, or a data signal generated by the receiver in response to the laser impinging on the receiver and transmitted back towards the beam generator, or a control system located elsewhere, in order to inform the beam generator of the beam impingement. The signal can be generated as a result of the laser impingement onto the PV cell, or onto a secondary detection sensor. The system may also use a detector detecting fluorescence of a phosphorescent object on the receiver. Such a beam impingement sensor may also include detecting of any signal generated by the receiver in response to the laser impinging on it, such as radio, ultrasound, light, upconverted light, downconverted light, or other signals. The user, or an external system may also cause an "on target" indication indicating that the laser is impinging on the PV or on the receiver correctly. For example, the client device being powered by the receiver may detect it receives power and inform the transmitter, such as via TCP/IP or wireless communication. Alternatively, a camera may be used to analyze where the laser beam is aimed at, and determine when the laser is aimed correctly, or a typical response may be detected and the maximum level of response, indicating the central impingement of the laser beam, reported to the transmitter.

The receiver typically includes a photovoltaic cell, voltage converting circuits, controller, laser impingement detector and a wireless communication system allowing it to communicate with the transmitter, or with a system controller located remote from the transmitter.

The transmitter system should include a scan detection stage, to locate the exact direction at which the receiver has been located, followed by a charge stage where the laser illuminates the PV cell of the receiver.

Figure 6:
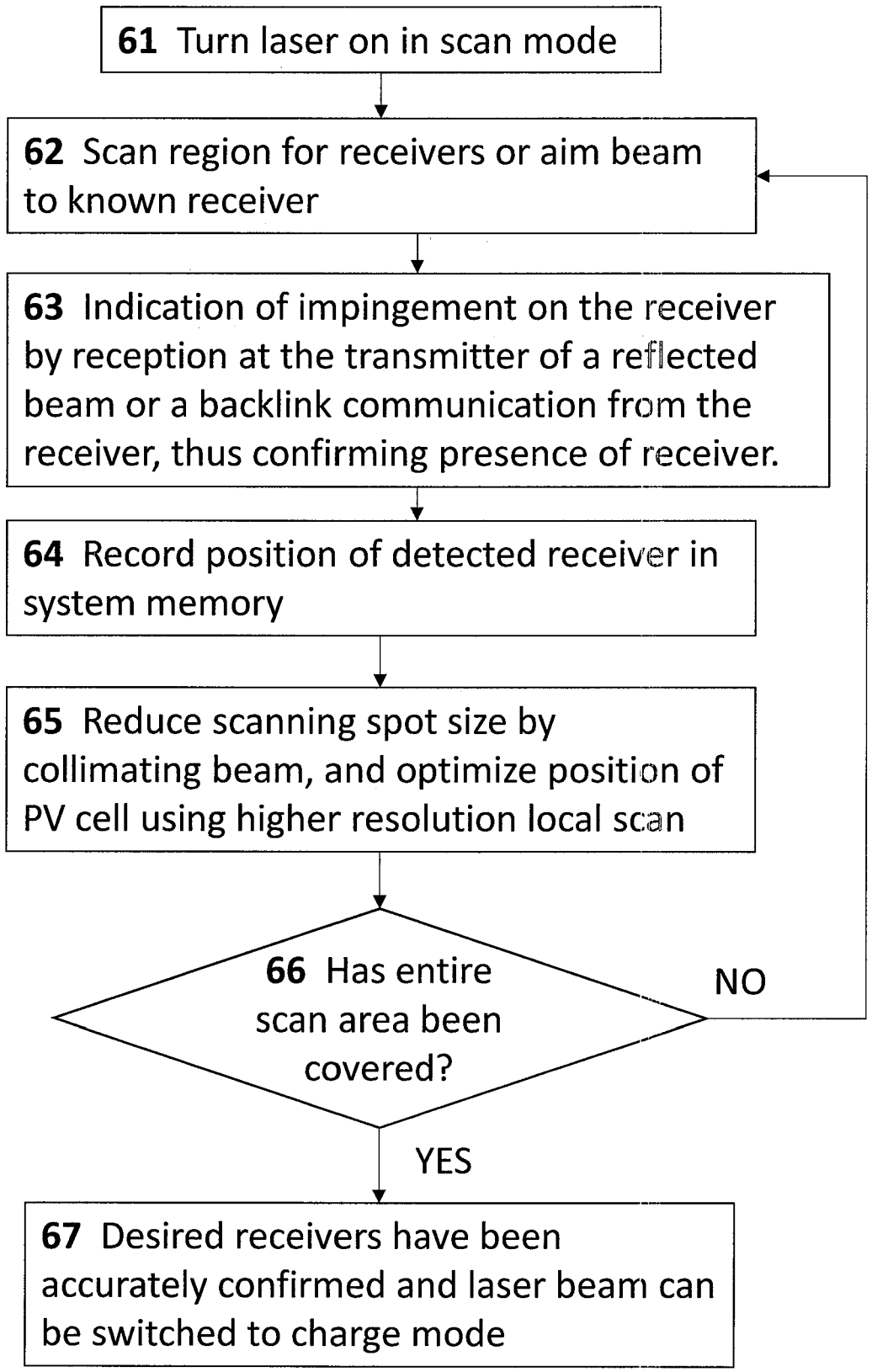
FIG. 6 is a flow chart illustrating one implementation of the methods of using the scanning mode for confirmed detection of receivers, before enabling the charging mode.

The system parameters required for the scanning mode are different from those used in the charging mode to be described below, and the system must be alternately optimized for both operations to achieve best performance. FIG. 6 is a flow chart illustrating one implementation of the protocol of the scanning mode operation of the system.

The scan mode is characterized by directing the laser beam along a path that may be predetermined, or alternatively, may be calculated "on the fly", as is done when the path is such as to search at known positions where receivers are expected to be found, as intended to cover the region where it is desired to detect and charge receivers. Such situations include, for example, searching for receivers around the door of a room, so that they are picked up as they enter the room, or searching for receivers attached to an electronic lock, or in a specific position in space for fixed type receivers, or searching for receivers shown in a camera image, or following directive markers such as those shown in International Patent Application No. WO 2019/224827 for "A Wireless Power System having Identifiable Receivers", commonly owned and having some common inventors with the present application. The path can have a rectilinear raster shape, or a spiral shape, or any other path which covers the area desired to scan. The response from the "on target" detector is detected by a sensor, such as by detecting retro-reflections from the receiver, radio or infrared data transmission from it, or an identifying image on it, such as a bar-code. Once several spatial points have been tested, an approximated position of the receiver is calculated. The approximated position may or may not be one of the scanned points, such as if the PV is surrounded by retro reflectors. In that case, reception of a retro-reflected signal indicates the presence of a receiver, but the actual position of the power receiving element of the receiver, such as a PV cell, is to be found at a position at which the scan did not yield a retro reflection. It is however still a position where a PV cell of the receiver is indicated.

After location of a receiver after scanning several spots with the scanning beam, the transmitter calculates the approximate position of the receiver. The transmitter may then perform a second scan, preferably using a smaller spot, to further localize the receiver with greater accuracy. The transmitter then aims the laser at the direction it determines that the power receiving element of the receiver is located, and can then switch to charge mode, having a smaller beam and higher power.

Referring now to FIG. 6, in step 61, the laser is turned on in its scan mode, which has a broad beam and a low power, well below the intensity that may cause damage to persons in the vicinity.

In step 62, the laser beam is scanned over its predetermined path, which, because of the broad spot size, can be a low resolution pattern, so that scanning can be performed rapidly.

During this scan, a receiver position can be found and recorded. Alternatively, the scanned beam can be directed to a known direction(s), where it has been previously determined that there may be a receiver.

In step 63, the receiver's presence is determined by detecting reflection from one or more retroreflector elements mounted on the receiver, or by receiving the backlink transmission from the receiver at the transmitter, this backlink providing information about the receiver presence and its unique ID or other information.

In step 64, the beam orientation towards the positively identified receiver, is recorded in the system memory, so that the beam can return to it if desired. This feature is useful since it enables the transmitter to select one of several selected targets, each of whose spatial location is known.

In step 65, the scanning spot is reduced in size by collimating the scanning beam, and the scan is continued at higher resolution around the region at which the receiver was detected, in order to locate the position of the power receiving element of the receiver more exactly.

In step 66, the system then determines whether the entire desired scanned area has been properly executed, and if not, control passes back to step 62 where a new scan attempt to find a known or unknown receiver is performed. At the same time, in step 66, the system control precludes the laser from switching to the charge mode. This prevents any potential danger of transmitting a charge mode beam when the system has not accurately pinpointed the power receiving element of a receiver.

On the other hand, if the scan conditions were successfully completed, then in step 67, a desired receiver has been accurately located, and its power receiving element pinpointed, such that the laser can be locked onto the power receiving element of the receiver. The laser can then be safely switched to charge mode and the power raised to that required to supply the receiver with its needs, the whole process being designed to avoid any dangerous exposure to the high powered charging beam.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Furthermore, it is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A wireless power transmitter for transmitting laser power to a receiver, the transmitter comprising:
    a laser beam generator adapted to emit a laser beam, the laser beam having at least one scanning mode and at least one charging mode, the at least one scanning mode having:
        (a) a lower power level than any charging mode beam, and
        (b) a beam area, at least at a maximal intended operation range of the transmitter, larger than the area of any charging mode beam,
    the laser beam generator further comprising at least one of:
        electrically insulated connections for powering the laser beam generator, the insulated connections adapted to reduce the likelihood of an inadvertent electrical connection to the laser beam generator, and
        at least one gated switch in each of the electrical connections, for controlling the flow of current through each of the electrical connections;
    a detection element configured to detect if the beam is directed towards a power receiving element of the receiver; and
    a controller configured to instruct a laser beam deflector to serially direct the laser beam in multiple directions, and to switch the laser beam generator from emitting a beam having at least one scanning mode to a beam having at least one charging mode when the detection element indicates that the laser beam is aimed in a direction where the presence of a power receiving element is indicated.

2. A wireless power transmitter according to claim 1, wherein the direction or the presence of the power receiving element of the receiver is indicated by a region of reflected light without additional detected reflections at a predetermined distance from the region of reflected light.

3. A wireless power transmitter according to claim 1, wherein the direction or the presence of the power receiving element of the receiver is indicated by a central region of an arrangement of peripherally spaced reflected light, having generally oppositely positioned elements of the arrangement at least a predetermined distance apart.

4. A wireless power transmitter according to claim 1, wherein the direction or the presence of the power receiving element of the receiver is indicated by a central region of reflected light, the central region of reflected light being surrounded by an arrangement of peripherally spaced reflected light, with elements of the arrangement being no more than a predefined distance from the central region of reflected light.

5. A wireless power transmitter according to claim 1, wherein the direction or the presence of the power receiving element of the receiver is indicated by a region of reflected light and at least one element directionally aligned towards the region of reflected light and disposed such that an end of the at least one element closest to the region of reflected light is disposed no more than a predetermined distance from the region of reflected light.

6. A wireless power transmitter according to claim 1, wherein detection of reflected light having a unique pattern known to be associated with at least one receiver, provides an indication of the position of the power receiving element of the receiver in a predetermined direction, at a predetermined lateral distance and in a predetermined alignment relative to the unique pattern of reflected light.

7. A wireless power transmitter according to claim 2, wherein the predetermined distance is at least the effective lateral dimension of the power receiving element of the receiver.

8. A wireless power transmitter according to claim 1, wherein the scanning mode has a beam area at the maximal operation range of the transmitter, at least 10% greater than the area of the charging mode at the same distance.

9. A wireless power transmitter according to claim 1, wherein the beam area is measured in a region of the beam having an intensity at least $1/e^2$ of the peak intensity of the beam.

10. A wireless power transmitter according to claim 1, wherein the laser beam deflector is of such a size that it can accommodate at least 75% of the area at the transmitter of a beam in a scanning mode.

11. A wireless power transmitter according to claim 1, wherein the controller is adapted, during charge mode operation, to direct the laser beam in a field of view significantly less than the full field of view of the beam.

12. A wireless power transmitter according to claim 11, wherein the field of view of the directed laser beam spans less than 0.008 steradians.

13. A wireless power transmitter according to claim 1, wherein the multiple directions comprise a predetermined scanning pattern.

14. A wireless power transmitter according to claim 1, wherein the laser generator emits a beam by application of a voltage of no more than 1.5 V.

15. A wireless power transmitter according to claim 1, wherein the gated switches for controlling the flow of current through each of the electrical connections are activated by a gate driver having an operating voltage higher than the operating voltage of the controller.

16. A wireless power transmitter according to claim 15, wherein the gate driver is configured to hold each of the gated switches in its conducting state, when the gate driver is instructed to activate the gate.

17. A wireless power transmitter according to claim 16, wherein a fall of the operating voltage of the gate driver to a level below the operating voltage of the controller, causes the gate switches to revert to a non-conducting state.

18. A wireless power transmitter according to claim 1, wherein the power receiving element of the receiver is at least one photovoltaic cell.

19. A wireless power transmitter according to claim 1, wherein before instructing the laser beam generator to emit a beam having a charging mode, the controller is further configured to instruct the beam generator to reduce the area of the scanning beam such that the location of a power receiving element is indicated with increased accuracy.

20. A wireless power transmitter according to claim 12, wherein the electrically insulated connections adapted to reduce the likelihood of an inadvertent electrical connection to the laser beam generator includes insulation of the C-mount or sub-mount of the laser generator.

* * * * *